Patented Oct. 18, 1949

2,484,878

UNITED STATES PATENT OFFICE 2,484,878

METHOD OF PREPARING PROTEIN DISPERSIONS

James J. Eberl, Bound Brook, N. J., assignor to Hercules Powder Company, Wilmington, Del., a corporation of Delaware No Drawing. Application March 6, 1947, Serial No. 732,935

5 Claims. (Cl. 106—154)

This invention relates to dispersing protein with alkali, and more particularly to dispersing water-extracted soybean protein in aqueous solutions to form dispersions of controlled viscosity at a low pH.

The protein extracted from soybeans has been known for some time and in recent years has become increasingly important in the fields of coating compositions, filaments, etc. The isolation of this protein has usually been accomplished by extraction of the bean meal with alkali, this being accompanied by a denaturation which causes the protein to gel in alkaline dispersions of high concentration, and once dried, to be soluble in aqueous media only at a relatively high pH. To overcome the undesirable tendency to gel, the protein commonly has been hydrolyzed with alkali solution, thus reducing its tendency toward gel formation. Such hydrolysis, however, is, in certain respects, undesirable because the protein obtained thereby is darker and its scope of use, for example, in fiber formation, may become more limited.

In the copending application dated January 28, 1947, Serial No. 724,838, a solution to the problem is proposed through the discovery that under suitable conditions there could be isolated a soybean protein which dissolved readily in weakly alkaline media to give solutions of low viscosity. However, in some instances, it is desirable to use a denatured protein and while this carefully isolated protein can readily be denatured for such use, the product which has been denatured by conventional methods has the same undesirable tendency to gel in alkaline solutions at high concentrations which is encountered in a protein denatured during the isolation. Thus, when it was desired to use a denatured protein, some method had to be developed for effecting the denaturation without, at the same time, giving solutions of high viscosity.

Now in accordance with the present invention, it has been found that undenatured soybean protein obtained, for example, by means of water-extraction of the bean meal as described in the copending application described above, may be dispersed by mixing an aqueous slurry of undenatured hydrated protein with a dispersion of protein in alkali to give a dispersion of soybean protein of controlled viscosity at a low pH. The product is highly desirable by reason of the fact that there may be prepared nongelling dispersions at a low pH over a wide range of protein concentration, with a flexible and controlled viscosity; in addition, the method itself has the advantage of being simpler to carry out and more economical than procedures involving the hydrolysis of the protein with large amounts of alkali followed by neutralization of the excess alkali by addition of acid.

In practice, a portion of undenatured protein is hydrated by soaking with water and is then treated with a solution of alkali to give a dispersion of denatured protein, this denaturation being carried out under carefully controlled conditions of temperature and pH in order to avoid any substantial amount of hydrolysis. The denatured dispersion is then mixed, with stirring, with a second portion of hydrated undenatured protein to give the desired nongelling dispersion of protein.

The following examples may be taken as ways in which the principle of the invention may be applied, but are not to be construed as limiting the same.

Example I

Twelve parts of dry water-extracted undenatured soybean protein was mixed with 42 parts of water and allowed to stand for 30 minutes. To this mixture 1.04 parts of sodium hydroxide in 49 parts of water was added slowly with stirring, and the resulting dispersion stirred further for 30 minutes at a temperature below 35° C. The portion of dispersed protein obtained in this manner was then added with stirring to a portion of hydrated protein prepared as above by allowing 20 parts of water-extracted protein to stand for 30 minutes in 80 parts of water. The product thus obtained contained 16% protein and had a pH of about 8.7; it was nongelling.

Example II

A protein suspension was prepared according to the method of Example I, as follows: Four parts of water-extracted undenatured protein containing 8% moisture was hydrated with 27.25 parts of water and treated with 3.125 parts of a .504 N. sodium hydroxide. To this was then added, with stirring, a second portion of protein containing 17.6 parts of protein hydrated with 44.9 parts of water. The product thus formed contained 16% of protein, had a pH of 8.9, a Stormer viscosity of 312 centipoises at 1 revolution per second, and was nongelling.

A coating color was prepared from this protein dispersion by mixing 75 parts of this dispersion with 100 parts of coating clay and 145 parts of water. The resulting coating mixture had a Stormer viscosity of 250 centipoises at 1 revolu- Protein to be denatured according to this invention is preferably hydrated by soaking in water to cause a swelling and render the material more readily dispersible in alkaline solution. This hydration may be usually carried out at room temperature and preferably will be continued for about ¼ hour or longer, usually at least ½ hour.

The portion of hydrated protein denatured with alkali can be less than the proportion of undenatured protein; in general the denatured portion of the protein will be less than about 70 parts for each 100 parts of undenatured protein, preferably between about 10 and 60 parts per 100 parts undenatured protein, depending on the properties desired in the final dispersion.

The amount of alkali needed to denature this portion of protein depends on the proportion of undenatured to denatured protein to be used, and there is used enough alkali to raise the pH to a range of about 11 to 12.5, this range being effective to denature the protein. However, care should be taken in the selection of the proportions to maintain the ratio of total protein to alkali sufficiently high so that the final pH of the dispersion is below about 10.0.

In altering the amount of alkali, since the proportion of cut to uncut protein is variable, care must be taken that sufficient amount of this alkali is added to denature adequately the first portion of protein while, at the same time, avoiding concentrations which would result in a pH high enough to cause any substantial degree of hydrolysis.

The concentration of protein in the portion being denatured preferably is low enough to avoid the formation of a gel and, in general, varies between about a 6% and about a 12% dispersion. The concentration of the protein in the portion which is not denatured may be considerably higher without the danger of gelling, for example, as high as about 25% or even higher, since this portion is merely hydrated but not peptized and therefore does not tend to gel. Accordingly, the final concentration of the protein may, if desired, be above 12% without the formation of a gelling dispersion. In the preferred embodiment of the invention, the final concentration of the dispersion will be between 12% and about 25%. Although the protein in that portion to be dispersed will alkali and mixed with undenatured protein need not wholly be undenatured, in general, it should not have undergone any substantial amount of hydrolysis during its isolation, since the solubility of the protein in low pH media becomes markedly changed by even partial denaturation.

By changing the foregoing variables, widely different concentrations, viscosities, or proportions of denatured to undenatured molecules may be obtained. For example, a dispersion having an arbitrarily selected concentration can be prepared to have a viscosity varying between wide limits at a predetermined, preferably low, pH. Conversely, there can be prepared dispersions having the same viscosities with their percentage compositions and pH greatly different. Thus, there is wide latitude in preparing dispersions to meet various specifications and requirements.

While the examples given represent the preferred form of applicant's invention, numerous modifications are possible. According to one method, the alkali-dispersed protein with which the undenatured protein is mixed may be obtained by the extraction of soybean meal with alkaline or acid solvents. Such extracted protein, while denatured, preferably should not have undergone any substantial amount of hydrolysis, for products obtained from hydrolyzed protein will not possess the desired characteristics. Although water-extraction of the soybean meal provides the most satisfactory undenatured protein, material which may be employed throughout applicant's process may be obtained by an isoelectric point separation method, such as, for example, that described in U. S. Patent 2,297,685.

Although the protein shown in the examples had been dried, a wet or partially precipitated protein may advantageously be used and by this means the drying and hydration steps are eliminated.

The step of denaturing a portion of the protein with alkali as shown in the examples was carried out at room temperature; however, if this operation is conducted at elevated temperatures, a smaller amount of alkali will be required to give the desired degree of denaturation and the final product still will possess the desired characteristics.

Sodium hydroxide was the cutting agent shown in the examples; however, other bases capable of giving the desired pH's may be used. Such agents include potassium hydroxide and certain amines and quaternary ammonium compounds.

The mixing of the cut and uncut portions of protein is usually carried out by adding the uncut portion rapidly with stirring to the cut portion. This procedure, however, may be reversed; also, the uncut portion may be added slowly, rather than rapidly, to the cut portion. This latter modification results in a solution of higher viscosity since a larger proportion of protein becomes denatured than if the excess alkali is neutralized at once by the rapid addition of uncut protein.

The improved product appears to consist in a molecular arrangement gradient from undenatured to completely denatured protein; thus, the product largely retains the advantages of undenatured protein while gaining the additional advantages of protein in various stages of denaturation.

The dispersions formed by the present process may be used directly or with various modifying agents as adhesives, they may be incorporated with pigments, etc., to be used in cold water paints, with fillers as paper coating compositions, or with suitable ingredients they may be spun into filaments.

This invention makes it possible to take advantage of the solubility properties of undenatured soybean protein in aqueous media at low pH, producing a protein useful for adhesives, coatings, filaments, and the like. At the same time, the procedure involved is simpler and less expensive than the heretofore known hydrolysis methods.

The term "denatured protein" used throughout refers to a protein which has been altered with respect to changes involving decrease in solubility and tending to cause molecular unfolding of the protein. Denaturation is distinct from hydrolysis in that the molecule is not broken into lower molecular weight units as in the latter process. Conversely, an "undenatured protein" is one in substantially its naturally occurring state, and, although it is realized that virtually any treatment of the protein may alter it to a degree, the undenatured protein of applicant's process has essentially the same high solubility and molecular formation as the natural occurring material. A "hydrolyzed protein" is one which has reacted with water, usually in the presence of an alkali or acid to form units of lower molecular weight, and, conversely, an "unhydrolyzed protein" is one having at least as high a molecular weight as the natural occurring substance, although here again a certain amount of hydrolysis may accompany any operation. The protein is referred to as being dispersed in alkali rather than dissolved because, although a homogeneous composition is obtained, the protein is probably in colloidal form rather than in true solution.

What I claim and desire to protect by Letters Patent is:

1. A method of preparing an aqueous dispersion of soybean protein characterized by having a controlled viscosity and a pH under about 10.0, comprising mixing 12 parts of undenatured soybean protein with about 42 parts of water, allowing said protein to hydrate, treating said hydrated protein with about 1.04 parts of sodium hydroxide in about 49 parts of water, stirring the resulting dispersion for about 30 minutes at a temperature below about 35° C., adding this dispersion with stirring to a portion of hydrated protein prepared by treating about 20 parts of undenatured soybean protein with about 80 parts of water.

2. An aqueous dispersion of soybean protein having a protein concentration over about 12% and characterized by a controlled viscosity and a pH under about 10, comprising a mixture of an aqueous alkaline dispersion of denatured soybean protein at a concentration between about 6 and about 12% and an aqueous slurry of substantially undenatured hydrated soybean protein in a concentration between about 12 and about 25%, the undenatured and denatured protein being present in relative proportions of up to about 70 parts denatured protein per 100 parts of undenatured protein.

3. A method of preparing an aqueous dispersion of protein at a concentration over about 12% comprising mixing an aqueous slurry of substantially undenatured hydrated protein in a concentration above about 12% with an aqueous alkaline dispersion of denatured protein in a concentration under about 12%, the denatured and undenatured protein being in relative proportions of up to about 70 parts denatured protein per 100 parts undenatured protein.

4. A method of preparing an aqueous dispersion of protein at a concentration over about 12% and a pH below about 10 comprising mixing an aqueous slurry of substantially undenatured hydrated protein in a concentration between about 12 and about 25% with an aqueous alkaline dispersion of denatured protein at a concentration between about 6 and about 12% and at a pH between about 11 and about 12.5, the denatured and undenatured protein being in relative proportions of between about 10 and about 60 parts denatured protein per 100 parts undenatured protein.

5. A method of preparing an aqueous dispersion of soybean protein at a concentration over about 12% comprising mixing an aqueous slurry of substantially undenatured hydrated soybean protein in a concentration above about 12% with an aqueous alkaline dispersion of denatured soybean protein in a concentration under about 12%, the denatured and undenatured soybean protein being in relative proportions of up to about 70 parts denatured soybean protein per 100 parts undenatured soybean protein.

JAMES J. EBERL.

REFERENCES CITED

The following references are of record in the file of this patent:

UNITED STATES PATENTS

| Number | Name | Date |
| --- | --- | --- |
| 1,962,808 | Cone | June 12, 1934 |
| 2,334,607 | Christopher | Nov. 16, 1943 |
| 2,421,113 | Burnett et al. | May 27, 1947 |